C. W. & LOUISA H. HEERMANCE.
Strainer and Funnel Combined.
No. 6,614. Reissued Aug. 24, 1875.
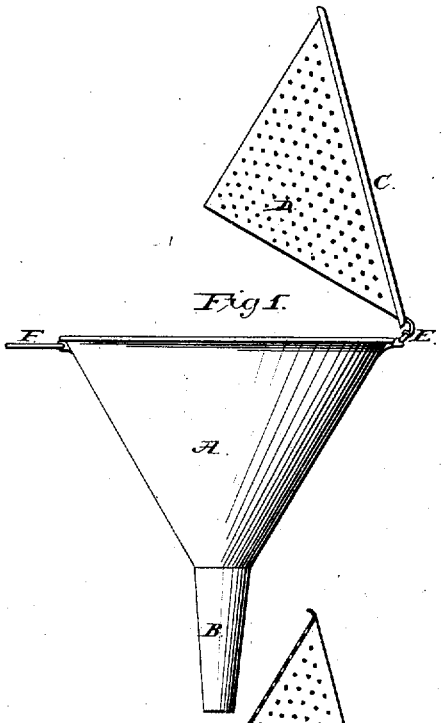
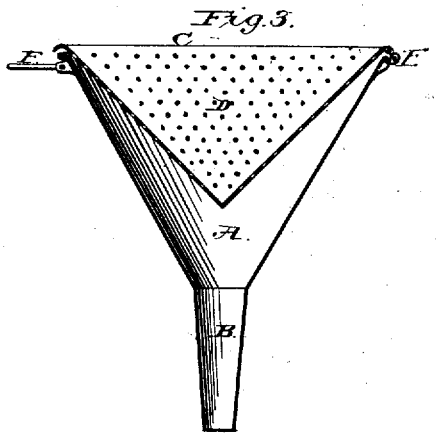
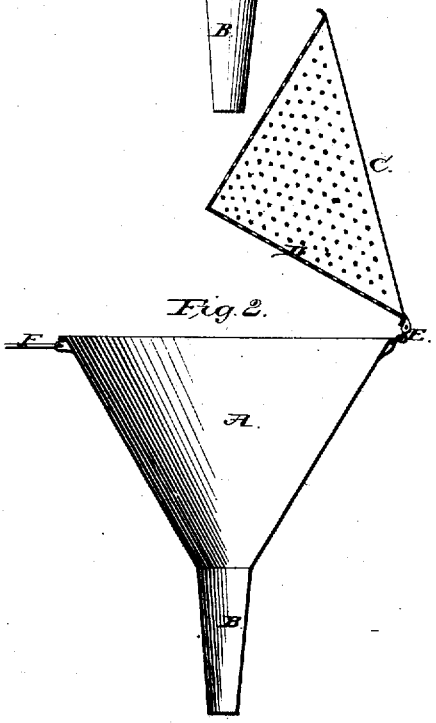
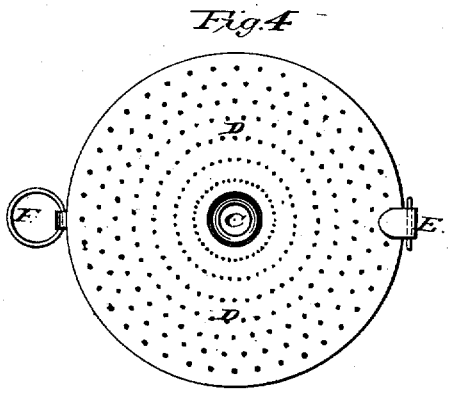
Witnesses:
Henry Eichling.
B. S. Clark.
Inventors:
Charles W. Heermance
Louisa H. Heermance
By J. P. Fitch
their Atty.
N. PETERS, PHOTO-LITHOGRAPHER, WASHINGTON, D. C.

UNITED STATES PATENT OFFICE.

CHARLES W. HEERMANCE AND LOUISA H. HEERMANCE, OF NEW YORK, N. Y.

IMPROVEMENT IN STRAINERS AND FUNNELS COMBINED.

Specification forming part of Letters Patent No. 132,963, dated November 12, 1872; reissue No. 6,614, dated August 24, 1875; application filed July 3, 1875.

*To all whom it may concern:*

Be it known that we, CHARLES W. HEERMANCE and LOUISA H. HEERMANCE, both of the city, county, and State of New York, have invented an Improved Combined Funnel and Strainer for culinary and like purposes, of which the following is a specification, reference being had to the accompanying drawing, forming part of the same.

Figure 1 represents a combined funnel and strainer embodying our invention, the strainer being swung upward on its connection with the funnel; Fig. 2, a sectional elevation of the same; Fig. 3, a section showing the strainer folded within the funnel when ready for use, and Fig. 4 a top view.

The necessity for this invention has been long felt by persons employed in culinary duties. When the strainer and funnel are separated, often the one may be found and the other cannot, while the presence of both may be requisite in performing the desired operation of straining and pouring fluids for the purposes of cooking and the table. This want led us to design this invention, the nature of which consists in the two inverted hollow cones, provided with a device for hinging them together, so that the cones fold one within the other, the outer cone being provided with a discharge-pipe, and the inner with perforations or fine openings.

In the drawings, A indicates the outer cone or funnel; B, the discharge-pipe; C, the inner cone or strainer; D, the perforations in said strainer, which may be made of metal, gauze, wire, or other suitable material; E, the device for hinging the strainer to the funnel; and F is a ring attached to the funnel, which may be provided as a convenience for hanging it in its place when not in use.

What we claim is—

As a new article of manufacture, the strainer C D, funnel A B, and the hinged device E, constructed and combined, as and for the purposes described.

CHAS. W. HEERMANCE.
LOUISA H. HEERMANCE.

Witnesses:

GEORGE LESTER,
EDWD. C. HENDERSON.